United States Patent
Lee

(10) Patent No.: US 6,181,930 B1
(45) Date of Patent: Jan. 30, 2001

(54) METHOD FOR AUTOMATIC SETTING OF AREA CODE IN CODE DIVISION MULTIPLE ACCESS (CDMA) MOBILE TELEPHONE SYSTEM

(75) Inventor: Yun-Hee Lee, Kyungki-Do (KR)

(73) Assignee: Samsung Electronics Co., Ltd. (KR)

(*) Notice: Under 35 U.S.C. 154(b), the term of this patent shall be extended for 0 days.

(21) Appl. No.: 09/137,807

(22) Filed: Aug. 20, 1998

(30) Foreign Application Priority Data

Aug. 20, 1997 (KR) .................................................. 97-39477

(51) Int. Cl.[7] ............................. H04Q 7/20; H04Q 7/38
(52) U.S. Cl. ........................ 455/426; 455/550; 455/566; 455/564; 455/432; 455/414; 455/31.2; 455/38.1; 370/310; 370/342; 370/441; 370/503; 370/479
(58) Field of Search ..................................... 455/426, 422, 455/432, 435, 412, 414, 566, 564, 550, 552, 31.2, 38.1, 434; 370/320, 310, 328, 342, 350, 441, 479, 503

(56) References Cited

U.S. PATENT DOCUMENTS

| | | | |
|---|---|---|---|
| 5,722,088 | * | 2/1998 | Storn et al. ........................ 455/562 |
| 5,732,349 | * | 3/1998 | Sanpei et al. ...................... 455/422 |
| 5,930,706 | * | 7/1999 | Raith .................................. 455/422 |

\* cited by examiner

*Primary Examiner*—Fan Tsang
*Assistant Examiner*—Keith Ferguson
(74) *Attorney, Agent, or Firm*—Dilworth & Barrese, LLP

(57) ABSTRACT

A call set-up method for a code division multiple access (CDMA) mobile communication system is provided. The method includes the step of transmitting call set-up information through an overhead channel from a base station transceiver subsystem (BTS) to a mobile station prior to a call set-up. The overhead channel includes a pilot channel, a sync channel, and a paging channel. The location and status of the mobile station is recognized, and the establishment of a communication between the BTS and the mobile station is prepared, by the BTS. An area code corresponding to the location of the BTS is transmitted from the BTS to the mobile station.

14 Claims, 3 Drawing Sheets

FIG. 2

| MESSAGE NAME | MESSAGE TYPE (BINARY) |
|---|---|
| SYSTEM PARAMETERS MESSAGE | 00000001 |
| ACCESS PARAMETERS MESSAGE | 00000010 |
| ~ | ~ |
| CDMA CHANNEL LIST MESSAGE | 00000100 |
| ~ | ~ |
| EXTENDED SYSTEM PARAMETERS MESSAGE | 00001101 |
| EXTENDED NEIGHBOR LIST MESSAGE | 00001110 |
| ~ | ~ |
| GLOBAL SERVICE REDIRECTION MESSAGE | 00010010 |
| AREA CODE SETTING MESSAGE | 11111111 |
| NULL MESSAGE | ............ |

FIG. 3

| FIELD | LENGTH(BITS) |
|---|---|
| MSG TYPE ('11111111') | 8 |
| AREA CODE | 10 |

METHOD FOR AUTOMATIC SETTING OF AREA CODE IN CODE DIVISION MULTIPLE ACCESS (CDMA) MOBILE TELEPHONE SYSTEM

BACKGROUND OF THE INVENTION

1. Field of the Invention

The present invention relates to mobile telephone systems and, more particularly, to a method for automatically setting the area code for a call in a code division multiple access (CDMA) mobile telephone system.

2. Description of the Related Art

A mobile communication system, such as a Code Division Multiple Access (CDMA) system for Personal Cellular Services (PCS), includes: base station transceiver subsystems (BTSs) for providing services to mobile stations; base station controllers (BSC); a base station management system (BSM) for managing a number of BSCs; a mobile switching center (MSC); and a location register (LR) system.

FIG. 1 is a schematic diagram illustrating the operation of a mobile communication system. A BTS 100 exchanges (transmits and receives) signals and data with a mobile station 200 through an antenna 150. In general, BTS 100 transmits an overhead channel composed of a pilot channel, a sync channel, and a paging channel to mobile station 200 prior to a call set-up. The BTS 100 transmits various types of information to mobile station 200, such as, for example, a pilot PN offset code, a system time, a system identification (ID), a network ID, a paging channel data rate, and a neighbor list.

The BTS 100 recognizes the location and status of mobile station 200 through the overhead channel, so a communication can be immediately established between BTS 100 and mobile station 200. The mobile station 200 transmits a specific frequency channel loading a telephone number to BTS 100 so that BTS 100 can be allocated a channel from a mobile switching center (MSC).

In order to establish a call in a mobile communication system having the above described architecture, the area code number (area code) of the subscriber receiving a call plus a telephone office number including the last four digits should be pressed. For example, when a subscriber who lives in Kumi City (Korea) wants to call his home, he should press 11 digits, such as "0546+123+4567". In the case that the subscriber wants to call a place having a shorter area code (e.g., Seoul City in Korea), he should press 9 digits such as "02+345+6789". However, if a subscriber is using a mobile telephone while driving an automobile or operating machinery, he or she may have an accident by having to press so many digits. In order to overcome the above problem of having to press numerous digits, a recently developed mobile telephone employs a method for storing a frequently used area code in the mobile telephone and using the stored area code when a subscriber makes a call. However, the method is deficient in that a mobile telephone using the method can only store one area code. Thus, if a subscriber wants to use several area codes, he should change the area code for each area to which he belongs and store it in the mobile telephone.

Therefore, as stated above, a maximum of 11 digits should be pressed to establish an out-of-town call from a mobile station in a mobile communication system according to the prior art. Further, even if the mobile station can store an area code, such storage may prove to be of no utility in the case that the location to be called does not correspond to the stored area code. Moreover, when a subscriber who visits at an unfamiliar area needs to make a call but does not know the corresponding area code, determining the area code may prove to be quite an inconvenience.

Another conventional approach to the above problem is disclosed in U.S. Pat. No. 5,732,349, filed on Mar. 24, 1998, and entitled "System and method for controlling a portable telephone according to discriminated area code". A system according to the U.S. Pat. No. 5,732,349 patent stores frequency band information associated with a plurality of areas in which the telephone can be operated and automatically sets an environment for communication according to each area. The system includes: a communication control unit; a memory for storing control information; a receiver for receiving an area signal; and a reading unit for reading a control signal from the memory. The receiver classifies an area code received from the base station. The reading unit reads one of the control signals from the memory in accordance with the area signal using the area code. The communication control unit controls communication through the base station by changing the communication environment of the mobile station in accordance with the control information.

However, the invention of the U.S. Pat. No. 5,732,349 patent is not particularly effective with respect to a CDMA system, since the CDMA system is not deficient with respect to matching frequency bands to corresponding areas. Instead, in the CDMA system, it would be desirable and highly advantageous for a subscriber to be provided with area code information when the subscriber is in a new area.

SUMMARY OF THE INVENTION

It is an object of the present invention to provide a method for automatically setting the area code in code division multiple access (CDMA) mobile telephone system.

To achieve the above and other objects, a call set-up method for a code division multiple access (CDMA) mobile communication system is provided. The method comprises the steps of: transmitting call set-up information through an overhead channel from a base station transceiver subsystem (BTS) to a mobile station prior to a call set-up, the overhead channel including a pilot channel, a sync channel, and a paging channel; recognizing a location and a status of the mobile station and preparing to establish a communication between the BTS and the mobile station, by the BTS; and transmitting an area code corresponding to a location of the BTS, from the BTS to the mobile station.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating a data format for message groups of the paging channel according to the IS-95 standard;

FIG. 3 is a diagram illustrating a data format according to an embodiment of the present invention for an area code setting message and an area code transmitted through the paging channel.

DETAILED DESCRIPTION OF PREFERRED EMBODIMENTS

Figure 1:
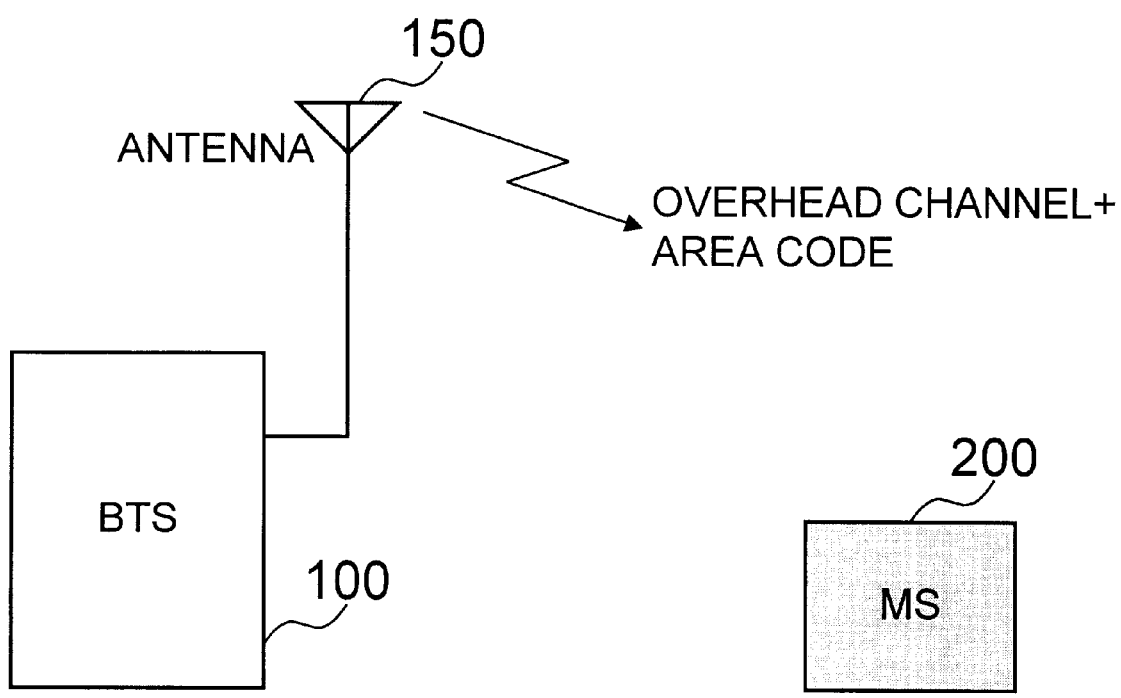
FIG. 1 is a schematic diagram illustrating the operation of a mobile communication system.

In accordance with the present invention, the area code corresponding to the location of a base station transceiver subsystem (BTS) is transmitted from the BTS to a mobile station via a paging channel in a forward overhead channel.

The mobile station is synchronized with the BTS using information transmitted through a sync channel in order to receive mobile telephone services. The paging channel is used in a code division multiple access (CDMA) mobile telephone system to process commands when the mobile station is powered-on and a call is not set-up, or so that the mobile station can receive a number. Some of the functions of the paging channel include: calling a mobile station by the number of a subscriber; transmitting overhead information; assigning a traffic channel for communication between a mobile station and a BTS.

FIG. 2 is a diagram illustrating a data format for message groups of the paging channel according to the IS-95 standard. The contents of the information of the message groups transmitted through the paging channel can be discerned from the first 8 bits of a message. Some important data formats of the paging channel will now be described with reference to FIG. 2. If the initial binary message group (bit stream) is 00000001, 00000010, 00000100, 00001101, 00001110, or 00010010, then the paging channel transmits information for system parameters, access parameters, CDMA channel list, extended system parameters, extended neighbor (i.e., adjacent BTS) list, or global service redirection, respectively.

Each of the above message groups is transmitted periodically or when necessary. The Null Message, which is represented in the last portion of FIG. 2, is an area that a system operator can optionally use.

A new message may be added for the purpose of indicating the area code. The new message may be used as described above. Alternatively, the area code may be added to an existing paging channel message, such as, for example, the system parameters message.

According to an embodiment of the present invention, if the initial binary message group is 11111111, then the paging terminal transmits information for area code setting. Preferably, the last number of 11111111 is rarely used for indicating other message types.

The present invention provide s a method for transmitting information in the above described message groups which includes a maximum of 4 digits representing an area code. The area code used in the Republic Of Korea is a 4-digit number having the first digit equal to 0, such as "0123". In other countries such as, for example, the United States of America, the area code is represented by a 3-digit number without the 0, such as "456". The area code used in the Republic Of Korea is transmitted omitting the first digit of 0. Thus, three digits are sufficient for transmission of the area code in all the cases. Accordingly, 10 binary bits are necessary to represent the maximum value of 999 of the three digits of the area code, since $2^{10}$ is equal to 1024. This is shown in FIG. 3, which is a diagram illustrating a data format according to an embodiment of the present invention for the area code setting message and the area code transmitted through the paging channel. In accordance with the embodiment of the invention, the area code setting message is represented by 8 binary bits. However, it is to be understood that the length of the area code and area code setting message may be varied in accordance with practical considerations.

The mobile station conforms to the IS-95 standard, which is an international standard directed to the communication between a mobile station and a BTS. Therefore, all mobile stations receive the paging channel as described above. However, in order for the mobile station to read the area code included in a message group of the paging channel and display it on a display screen, some modification of the software (S/W) program in the mobile station is performed.

A method for automatically setting the area code according to an embodiment of the present invention will now be described. A mobile station in a CDMA mobile communication system receives and reads information via the overhead channel transmitted from the BTS on the POWER-ON status of a mobile station in order to establish or release a call. The mobile station sets up an initial condition necessary for establishing a call using the information transmitted via the overhead channel.

The mobile station reads the area code of the BTS it is presently communicating with from the paging channel of the overhead channel. At this time, the mobile station constantly displays information received from the BTS on a display screen. The information may include, for example, the receiving signal strength, whether service is available or not, whether the communication is being performed in analog or CDMA mode, and whether a message is received or not.

When a mobile telephone subscriber wants to call a specific local area, he or she need only press 7 digits (or 8 digits) following the area code and the SEND button. The mobile station then makes the call automatically including the area code number.

When the mobile telephone subscriber wants to call a public switched telephone network (PSTN) subscriber in an area outside of the location area corresponding to the displayed area code, a S/W programmable method deletes the displayed area code. Then, the mobile telephone subscriber presses the area code and telephone number of the PSTN subscriber. The displayed area code may be deleted by any number of methods such as, for example, by pressing the END button.

Also, when the mobile telephone subscriber wants to call another subscriber who is serviced by a different mobile communication system, and the call does not require the input of an area code, the area code displayed on the display screen of the mobile station may be deleted using the above methods. Then, the subscriber may press the telephone number of the other subscriber.

If a BTS that transmits an area code according to the present invention communicates with a conventional mobile station, the conventional mobile station is used as a normal mobile terminal since it does not include the function of automatically adding the area code.

Thus, the present invention provides additional advantages to a mobile telephone subscriber as described below. A mobile telephone subscriber may make a call to a location area in which he belongs such that the area code is automatically provided without the subscriber fully pressing the area code numbers. Moreover, the area code of an unfamiliar area in which the subscriber is located may be immediately discerned. Also, when a mobile telephone subscriber moves to an unfamiliar location at night, making his current location all the more difficult to discern, he may be able to roughly determine his current location from the area code displayed on the display screen of his mobile terminal. Furthermore, a change in displayed area code makes it possible to discern the location of an area code change. That is, a location where there may be overlap between different BTSs having different area codes may be determined. Such information may help in determining a network plan or cell plan, since the communication system operator or provider can recognize and consider the area code conversion area.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A call set-up method for a code division multiple access (CDMA) mobile communication system, comprising the steps of: transmitting call set-up information through an overhead channel from a base station transceiver (BTS) to a mobile station prior to a call set-up, the overhead channel including a pilot channel, sync channel and paging channel; recognizing a location and a status of the mobile station and preparing to establish a communication between the BTS and the mobile station, by the BTS; transmitting an area code corresponding to a location of the BTS, from the BTS to the mobile without adjusting frequency or other communication parameters of the mobile station; displaying the area code on a display screen of the mobile station; and pressing a telephone number following the displayed area code to call a Public Switched Telephone Network (PSTN) subscriber located in an area corresponding to the displayed area code, the call being established with the displayed area code.

2. The method of claim 1, wherein a data format of the paging channel supports an IS-95 standard.

3. The method of claim 1, wherein the mobile station employs a binary bit stream of "11111111" as an area code setting message.

4. The method of claim 1, wherein the area code is transmitting to the mobile station in a paging channel message.

5. The method of claim 1, wherein the mobile station synchronizes to the BTS using information transmitted through the sync channel from the BTS, and displays data transmitted through the paging channel on a display screen.

6. The method of claim 5, wherein the data transmitted through the paging channel is an area code setting message.

7. The method of claim 6, wherein the area code setting message is "11111111".

8. The method of claim 5, wherein the data transmitted through the paging channel is a message including the area code.

9. The method of claim 8, wherein the message is a system parameters message.

10. The method of claim 5, wherein the data transmitted through the paging channel includes the area code.

11. The method of claim 1, further comprising the steps of:

displaying the area code on a display screen of the mobile station; and pressing a telephone number following the displayed area code to call to a Public Switched Telephone Network (PSTN) subscriber within a current area.

12. The method of claim 1, further comprising the steps of:

displaying the area code on a display screen of the mobile station; and deleting the displayed area code and pressing a telephone number including a different area code to call to a Public Switched Telephone Network (PSTN) subscriber located outside an area corresponding to the displayed area code.

13. The method of claim 1, further comprising the steps of:

displaying the area code on a display screen of the mobile station; and deleting the displayed area code and pressing a telephone number to call a subscriber of a different mobile communication service.

14. The method of claim 1, wherein ten binary bits are used to represent the area code transmitted from the BTS to the mobile station.

* * * * *